(12) United States Patent
Widegren

(10) Patent No.: US 10,153,589 B2
(45) Date of Patent: Dec. 11, 2018

(54) SYSTEM FOR AUTOMATICALLY ESTABLISHING A TEMPORARY ELECTRICAL POWER CONNECTION

(71) Applicant: IPALCO BV, Woerden (NL)

(72) Inventor: Michael Widegren, Lugano (CH)

(73) Assignee: IPALCO BV, Woerden (NL)

( * ) Notice: Subject to any disclaimer, the term of this patent is extended or adjusted under 35 U.S.C. 154(b) by 0 days.

(21) Appl. No.: 15/749,997

(22) PCT Filed: Aug. 4, 2016

(86) PCT No.: PCT/EP2016/068654
§ 371 (c)(1),
(2) Date: Feb. 2, 2018

(87) PCT Pub. No.: WO2017/021495
PCT Pub. Date: Feb. 9, 2017

(65) Prior Publication Data
US 2018/0226750 A1    Aug. 9, 2018

(30) Foreign Application Priority Data

Aug. 6, 2015    (LU) .......................................... 92790

(51) Int. Cl.
*H01R 39/00*    (2006.01)
*H01R 13/631*    (2006.01)
(Continued)

(52) U.S. Cl.
CPC ......... *H01R 13/6315* (2013.01); *H01R 13/08* (2013.01); *H01R 13/14* (2013.01);
(Continued)

(58) Field of Classification Search
CPC .. H01R 13/6315; H01R 4/64; H01R 13/5219; H01R 13/14; H01R 13/521; H01R 13/08;
(Continued)

(56) References Cited

U.S. PATENT DOCUMENTS 3,411,125 A * 11/1968 Hill .................... G01R 1/06788
324/72.5
3,783,432 A * 1/1974 Biba .................... H01J 29/925
439/41
(Continued)

FOREIGN PATENT DOCUMENTS

GB          294305         7/1928
JP      2002329549 A      11/2002

OTHER PUBLICATIONS

International Search Report; International Application No. PCT/EP2016/068654; International Filing Date Aug. 4, 2016; dated Sep. 20, 2016; 4 pages.
(Continued)

*Primary Examiner* — Jean F Duverne
(74) *Attorney, Agent, or Firm* — Cantor Colburn LLP

(57) ABSTRACT

A system for automatically establishing a temporary electrical power connection comprises a first coupling member including a sealing ring surrounding a first electrical coupling means and a second coupling member including a sealing ring contact surface surrounding a second electrical coupling means. The sealing ring and the sealing ring contact surface are configured for being pressed together, whereby they seal off a vacuum chamber. A vacuum conduit is connected to the vacuum chamber for establishing therein a vacuum capable of firmly holding together both coupling members, thereby defining a mechanical coupling position. The first or second electrical coupling means include a surface electrode dimensioned for achieving a plurality of possible electrical coupling positions around a central electrical coupling position. The seal ring and seal ring contact surface are configured for achieving a sealed contact and thereby a mechanical coupling position in each of these possible electrical coupling positions.

20 Claims, 7 Drawing Sheets

(51) Int. Cl.
   *H01R 13/08* (2006.01)
   *H01R 13/52* (2006.01)
   *H01R 13/24* (2006.01)
   *H01R 13/14* (2006.01)
   *B60L 11/18* (2006.01)
   *H02J 4/00* (2006.01)
   *H01R 13/443* (2006.01)

(52) U.S. Cl.
   CPC ....... *H01R 13/2407* (2013.01); *H01R 13/521* (2013.01); *H01R 13/5219* (2013.01); *B60L 11/1818* (2013.01); *B60L 11/1827* (2013.01); *H01R 13/443* (2013.01); *H02J 4/00* (2013.01)

(58) Field of Classification Search
   CPC ..... H01R 13/2407; H01R 13/443; H02J 4/00; B60L 11/1827; B60L 11/1818; H01J 29/925
   See application file for complete search history.

(56) References Cited

U.S. PATENT DOCUMENTS

| | | | |
|---|---|---|---|
| 3,784,952 A * | 1/1974 | Murray | H01J 29/925 439/41 |
| 4,685,752 A * | 8/1987 | Costar | H01R 4/64 439/96 |
| 6,213,784 B1 | 4/2001 | Cairoli et al. | |
| 6,561,825 B1 | 5/2003 | McHugh et al. | |
| 2012/0064736 A1 | 3/2012 | Shuai | |
| 2014/0057463 A1 | 2/2014 | Bhimavarapu et al. | |
| 2015/0336677 A1 | 11/2015 | Smaoui et al. | |

OTHER PUBLICATIONS

Written Opinion of the International Searching Authority; International Application No. PCT/EP2016/068654; International Filing Date Aug. 4, 2016; dated Sep. 20, 2016; 7 pages.

* cited by examiner ically establishing a temporary electrical power connection between two electrical power distributions, in which a strong and reliable connection between two coupling members is achieved even in case of major axial misalignments.

It is a further object of an aspect of the present invention to provide a simple and reliable system for automatically establishing a temporary electrical power connection to a vehicle, a ship or an aircraft.

It is a further object of an aspect of the present invention to provide a system for simultaneously mooring a ship and establishing a temporary electrical power connection to the latter.

SUMMARY OF INVENTION

According to a first aspect, the invention concerns a system for automatically establishing a temporary electrical power connection between a first and a second electrical power distribution. This system comprises a first coupling member with a first electrical coupling means electrically connected to the first electrical power distribution and a separate second coupling member with a second electrical coupling means electrically connected to the second electrical power distribution. The first coupling member includes a sealing ring surrounding the first electrical coupling means. The second coupling member includes a sealing ring contact surface surrounding the second electrical coupling means. This sealing ring and this sealing ring contact surface are configured for being pressed together, whereby a vacuum chamber arranged between the first coupling member and the second coupling member is hermetically sealed off with regard to the atmosphere. By generating a vacuum in the vacuum chamber, the first coupling member and the second coupling member are coupled together in a mechanical coupling position in which the first electrical coupling means and the second electrical coupling means achieve an electrical coupling position for transferring electrical energy between the first and the second electrical power distribution. At least one vacuum conduit is connected to the vacuum chamber for establishing in the vacuum chamber a vacuum sufficient for firmly holding together the first coupling member and the second coupling member in their coupling position by the air pressure of the surrounding atmosphere, thereby defining a strong mechanical coupling position. The first or the second electrical coupling means include a surface electrode dimensioned for allowing a plurality (or even an infinity) of possible electrical coupling positions in a zone around the centre of the surface electrode, thereby achieving electrical coupling positions with important axial alignment tolerances (e.g. in the range of several centimeters and even several decimeters). The seal ring and seal ring contact surface are configured for achieving a sealed contact and thereby a mechanical coupling position in each of these possible electrical coupling positions.

It will be appreciated that this solution for warranting a strong mechanical coupling between both coupling members requires neither a precise alignment of complementary mechanical coupling or interlocking parts nor the presence of any kind of mechanical locking mechanism. Consequently, in case of misalignments, no blocking can occur during the mechanical coupling or decoupling operation. Furthermore, due to the absence of any complementary mechanical coupling parts and of any kind of mechanical locking mechanism, the system becomes less complicated and more compact. As the system is, as far as regards the mechanical coupling between both coupling members,

SYSTEM FOR AUTOMATICALLY ESTABLISHING A TEMPORARY ELECTRICAL POWER CONNECTION

CROSS REFERENCE TO RELATED APPLICATIONS

This is a U.S. national stage of PCT International Application No. PCT/EP2016/068654, filed on 4 Aug. 2016. Priority under 35 U.S.C. § 119(a) and 35 U.S.C. § 365(b) is claimed from Luxembourg Application No. 92790 filed 6 Aug. 2015, the disclosure of which is also incorporated herein by reference in its entirety.

TECHNICAL FIELD

The present invention generally relates to a system for automatically establishing a temporary electrical power connection between two electrical power distributions. It relates in particular to such a system used for automatically establishing a temporary electrical power connection to a vehicle, a ship or an aircraft.

BACKGROUND ART

Prior art systems for automatically establishing a temporary electrical power connection between a first and a second electrical power distribution, such as systems for automatically establishing a temporary electrical power connection to a vehicle, a ship or an aircraft, normally comprise a first coupling member with a first electrical coupling means electrically connected to the first electrical power distribution and a separate second coupling member with a second electrical coupling means electrically connected to the second electrical power distribution. The first coupling member and the second coupling member are capable of being mechanically coupled together in a mechanical coupling position, in which the first electrical coupling means and the second electrical coupling means achieve an electrical coupling position for transferring electrical energy between the first and the second electrical power distribution. For the mechanical coupling between both coupling members, complementary mechanical coupling, alignment and/or interlocking parts must be provided on each coupling member and—during the connection operation—these complementary parts must be properly aligned to successfully establish the connection. Furthermore, a mechanical locking mechanism has to be provided if one wants to warrant that both coupling members cannot easily uncouple during electric power transfer. The necessity of a precise alignment of complementary mechanical coupling, alignment and/or interlocking parts makes the coupling system more complicated and—in case of fully automated systems—requires a precise positioning mechanism for at least one of the coupling members. Even small damages to these complementary mechanical coupling, alignment and/or interlocking parts and/or mechanical locking mechanisms may prevent a successful coupling or uncoupling of both coupling members. During electrical power transfer, the electrical coupling means have to be sufficiently protected against any contact with body parts, foreign objects and with fluids, which requires special electrical enclosures and further increases the costs of such systems. These special electrical enclosures are however easily damaged, whereby protection may become insufficient.

It is an object of the present invention to provide a system for automatically establishing a temporary electrical power insensitive to axial misalignments of the coupling members, the system is less susceptible to problems.

Due to the fact that the first or the second electrical coupling means include a surface electrode dimensioned for allowing a plurality (or even an infinity) of possible electrical coupling positions in a zone around the centre of the surface electrode, the first and second electrical coupling means can be easily configured for achieving electrical coupling positions with important axial alignment tolerances (e.g. of more than 1 cm, generally even more than 5 cm, and in some applications even more than 10 cm), thereby achieving a plurality (or even an infinity) of possible electrical coupling positions in a zone around a central electrical coupling position. As the sealing ring and the sealing ring contact surface are moreover configured for achieving a sealed contact in each of these possible electrical coupling positions, it becomes possible to automatically establish a temporary electrical power connection between a first and a second electrical power distribution, with very generous axial alignment tolerances between the first and second coupling member.

It will further be appreciated that during electrical power transfer, the electrical coupling means are moreover efficiently protected in the vacuum chamber against any contact with human body parts, with foreign objects and with fluids, so that expensive electrical enclosures are mostly unnecessary. Measuring the vacuum in the vacuum chamber easily ensures that the mechanical coupling between the first and second coupling member has been correctly completed. A vacuum monitoring system may also be used for unlocking electrical power transfer only if the system is in a safe state (i.e. the vacuum chamber is hermetically sealed), or for interrupting any electrical power supply to the system if the vacuum monitoring system indicates that there might be a problem. Such a vacuum monitoring system may e.g. monitor the pressure in the vacuum chamber and/or parameters of the vacuum generating device (e.g. its absorbed power or the flow rate of air exhausted out of the vacuum chamber).

The proposed system normally includes or is associated with a support mechanism supporting the first coupling member or the second coupling member. (Normally the first coupling member, i.e. the coupling member with the sealing ring will be supported by the support mechanism.) This support mechanism is configured for bringing the supported coupling member from a parking position into a coupling position and vice-versa. Due to the absence of mechanically interlocking parts and very generous axial alignment tolerances, the support mechanism does not require very precise positioning means and may therefore be less complicated, so that it is less susceptible to problems and less expensive.

In a first embodiment, one of the first and the second electrical coupling means is a surface electrode including a two-dimensional array of sockets, which are preferably packaged as densely as possible. The other electrical coupling means is in this case a rod-shaped electrode configured for axially penetrating into any one of the sockets. The sockets of the surface electrode preferably include funnel-shaped inlet sections, whose openings are aligned as close as possible to one another in a common plane. The rod-shaped electrode preferably includes a conically-shape front end. The surface electrode and/or the rod-shaped electrode are mounted so as to have two resiliently centred degrees of freedom, in a plane that is substantially perpendicular to the penetration direction of the rod-shaped electrode into the sockets. During penetration of the rod-shaped electrode into a socket, the electrical contact surfaces on the rod-shaped electrode and in the socket rub against one another, which cleans these contact surfaces to a certain extent from dirt and corrosion products, thereby improving the electrical contact. It will be appreciated that such electrical coupling means have been specifically designed for being used with the proposed vacuum coupling system. However, they may also be used in any other system in which first and second electrical coupling means have to warrant electrical coupling positions with important axial alignment tolerances.

In a further advantageous embodiment, the first or the second electrical coupling means include an axially movable contact electrode, which is mounted so as to be resiliently biased into a retracted parking position in its respective first or second coupling member and to be moved from this retracted parking position into a protruding electrical coupling position, when the vacuum chamber is put under vacuum. This embodiment allows to provide a protected parking position for the contact electrode (wherein it is e.g. protected by flexible flaps or one or more other protecting members) and to bring its front end automatically into an operational position (i.e. a protruding electrical coupling position), this without requiring any drive mechanism powered with auxiliary energy.

In another advantageous embodiment, the front end of a rod-shaped contact electrode is axially arranged in an opening of a mounting block. Its rear end is connected to a closed rear end of an axially compressible resilient rubber bellows. The opposite front end of this rubber bellows is open and connected in a sealed manner to the mounting block, so as to surround the opening and form a bellows chamber around the contact electrode. When a vacuum is established in the vacuum chamber, this bellows chamber is put under vacuum too. The atmospheric pressure then axially compresses the rubber bellows, whereby the latter axially pushes the contact electrode from its parking position, in which its front end is retracted in the opening, through the front-end seal and into an operational position, in which its front end protrudes out of the opening.

In an alternative embodiment, a contact electrode is connected to a piston of a piston assembly operated by the pressure difference between the vacuum chamber and the atmosphere and equipped with a piston retracting spring.

For achieving an improved electrical contact, the first and/or the second electrical coupling means may include a contact electrode connected to an electrode revolving or oscillating device. The latter is capable of rotating or oscillating the contact electrode about its central axis, when the contact electrode is in contact with a contact surface of the surface electrode. The rotating or oscillating contact electrode cleans the electrical contact surfaces from dirt and corrosion products. Such an electrode revolving or oscillating device may e.g. include a rotary or linear motor supplied with electricity or with a pressurized pneumatic or hydraulic fluid. It may also comprise a spring storing energy when the electrode is pushed into its operational position and releasing the stored energy by revolving the electrode about its central axis as soon as the electrode enters into contact with an electric contact surface. The electrode revolving device may also include a bimetal component, which is connected to the electrode so as to revolve the latter by a small angle about its central axis when it heats up due to the electric current that is transferred through the electrode. In yet another embodiment, the electrode revolving device is a mechanism transforming an axial oscillation of the electrode in an angular oscillation of the electrode about its central axis. To generate the axial oscillation of the contact electrode, the vacuum generating device may e.g. comprise a control system capable of modulating (i.e. alternately increasing and decreasing) the vacuum in the vacuum chamber relative to a reference pressure value $P_0$, whereby the axial spacing of the first and second coupling member is (due to the flexibility of the sealing ring) increased and decreased, and the contact electrode, which is in resilient contact with an opposite electric contact surface, is subjected to an axial oscillation. The latter is then transformed by the electrode revolving mechanism in an angular oscillation of the electrode about its central axis. Even if this angular oscillation of the electrode about its central axis has only a very small angular amplitude (e.g. an amplitude of only some degrees), this angular oscillation movement will normally result in a significant improvement of the electrical contact (i.e. in a significant reduction of contact resistance due e.g. to oxidation).

In an alternative embodiment, the electrical coupling means designed for contacting the surface electrode comprises an electrical contact shoe, which is mechanically connected via an articulation to a free end of a lever arm. The latter is pivotably connected to the respective coupling member, wherein a spring urges the contact shoe in a protruding position relative to the respective coupling member. When—during the coupling operation—this contact shoe comes in to contact with a surface electrode of the other coupling member, it rubs over this surface electrode, which cleans both electrical contact surfaces from dirt and/or oxides.

In a preferred embodiment of the system, the surface electrode comprises a frontal contact surface providing the plurality of possible electrical coupling positions, and the electrical coupling means cooperating with the surface electrode comprises a contact electrode. In each of the plurality of possible electrical coupling positions, the contact electrode can be pressed onto the frontal contact surface for establishing an electrical contact.

A preferred embodiment of the contact electrode advantageously includes a frontal contact device including a plurality of resilient fingers extending radially away from the contact electrode. Each of these resilient fingers has a free end with an electrical contact thereon. A preferred embodiment of the frontal contact device resembles a flower, wherein the resilient fingers are the petals of the flower. The resilient fingers and their electrical contacts are arranged so that, when the frontal contact device is pressed onto the frontal contact surface of the surface electrode, the resilient fingers rest with their electrical contacts on the frontal contact surface and are resiliently deformed. This embodiment warrants a reliable electrical contact with very simple means. It will be appreciated that these electrical coupling means have been specifically designed for being used with the proposed vacuum coupling system. However, they may also be used in any other system in which first and second electrical coupling means have to warrant electrical coupling positions with important axial alignment tolerances.

The contact electrode is advantageously supported by a linear actuator arranged for axially displacing the contact electrode along a central coupling axis, from a retracted parking position into a protruding electrical coupling position. In a preferred embodiment, the linear actuator includes a spring arranged so as to urge the contact device in a retracted parking position and a piston arranged so as to urge the contact device from the retracted parking position into a protruding electrical coupling position. This piston is advantageously vacuum operated when the vacuum chamber is put under vacuum. This embodiment allows to provide a protected parking position for the contact electrode (wherein it is e.g. protected by flexible flaps or one or more other protecting members) and to bring its front end automatically into an operational position (i.e. a protruding electrical coupling position), this without requiring any drive mechanism powered with auxiliary energy.

To improve contact between the electrical coupling means, the system advantageously comprises a vacuum generating device including a control system capable of pulsing or modulating the vacuum in the vacuum chamber relative to a reference value, whereby the axial spacing of the first and second coupling member is pulsed, and the electrical coupling means are subjected to a pulsed contact pressure. This pulsed contact pressure can then be easily transformed in a rubbing movement between the electrical coupling means, which substantially reduces contact resistance, by eliminating oxidation or contamination products on the contact surfaces.

The system may further comprise a dummy coupling member arranged in a parking position. This dummy coupling member includes an auxiliary sealing ring contact surface, wherein the sealing ring and the auxiliary sealing ring contact surface are configured for being hermetically pressed together. In this parking position, the electrical coupling means of the first coupling member are consequently well protected in the vacuum chamber against environmental impacts. If low ambient temperatures are to be expected, the dummy coupling member as a whole or its auxiliary sealing ring contact surface may be equipped with a heating device. The dummy coupling member may further be equipped with a cleaning system for the first electrical coupling means. Thus, the dummy coupling member is capable of optimally preparing the first coupling member for a coupling with the second coupling member even under extreme environmental conditions.

In a preferred embodiment, the first coupling member includes a cavity with an open end, which is surrounded by the sealing ring. The first electrical coupling means include several electrodes (e.g. surface electrodes or contact electrodes cooperating with surface electrodes) that are distributed within the cavity so as to be laterally spaced from one another.

It will be appreciated that—in the near future—the first electrical coupling means and the second electrical coupling means may also be configured for achieving a contactless power transfer using electromagnetic fields.

The proposed system is advantageously used for automatically establishing a temporary electrical power connection to a vehicle, a ship or an aircraft.

When used for automatically establishing a temporary electrical power connection to a ship, the system may further be configured to be sufficiently strong for additionally mooring the ship or, at least, for significantly contributing to the mooring of the ship. Because the system is capable of simultaneously performing two functions (i.e. mooring of the ship and establishing a temporary electrical power connection to the ship), it is very interesting as regards operational, organisational and cost aspects. Furthermore, safety is significantly improved, because the electrical connection to the ship takes place—without any direct human intervention—in a hermetically sealed vacuum chamber only if a strong mooring to the ship has already been established.

When used for additionally mooring the ship, the first coupling member is configured as a mooring suction pad capable of hermetically coupling to a ship hull for applying mooring forces directly to the ship hull. The second coupling member is integrated into the ship hull, in a zone wherein the mooring suction pad is hermetically coupled to the ship hull. The support mechanism is additionally configured for mechanically transferring the mooring forces, and the vacuum generating device is capable of establishing a vacuum in the vacuum chamber so that the mooring suction pad is capable of applying the mooring forces onto the ship hull. It follows that a mechanical mooring device for a ship, which is equipped with a mooring suction pad capable of hermetically coupling to a ship hull for applying mooring forces directly to the ship hull, can be easily complemented to be used for simultaneously mooring the ship and establishing a temporary electrical power connection to the ship.

The invention also proposes a device for automatically establishing a temporary electrical power connection in a system as proposed hereinbefore. Such a device includes the first coupling member with the first electrical coupling means to be electrically connected to the first electrical power distribution, and with the sealing ring surrounding the first electrical coupling means. At least one vacuum conduit is connected to the first coupling member to be capable of establishing, in the coupling position with the second coupling member, a vacuum in the vacuum chamber, which vacuum is capable of firmly holding together the first coupling member and the second coupling member in this coupling position. The device usually further includes a support mechanism, which supports the first coupling member and is configured for automatically bringing the first coupling member from a parking position into the coupling position and vice-versa.

BRIEF DESCRIPTION OF DRAWINGS

The afore-described and other features, aspects and advantages of the invention will be illustrated by the following description and the attached drawings, wherein.

DETAILED DESCRIPTION OF PREFERRED EMBODIMENTS OF THE INVENTION

Follows a detailed description of preferred embodiments illustrating, by way of example, different aspects of the proposed invention.

Figure 1A:
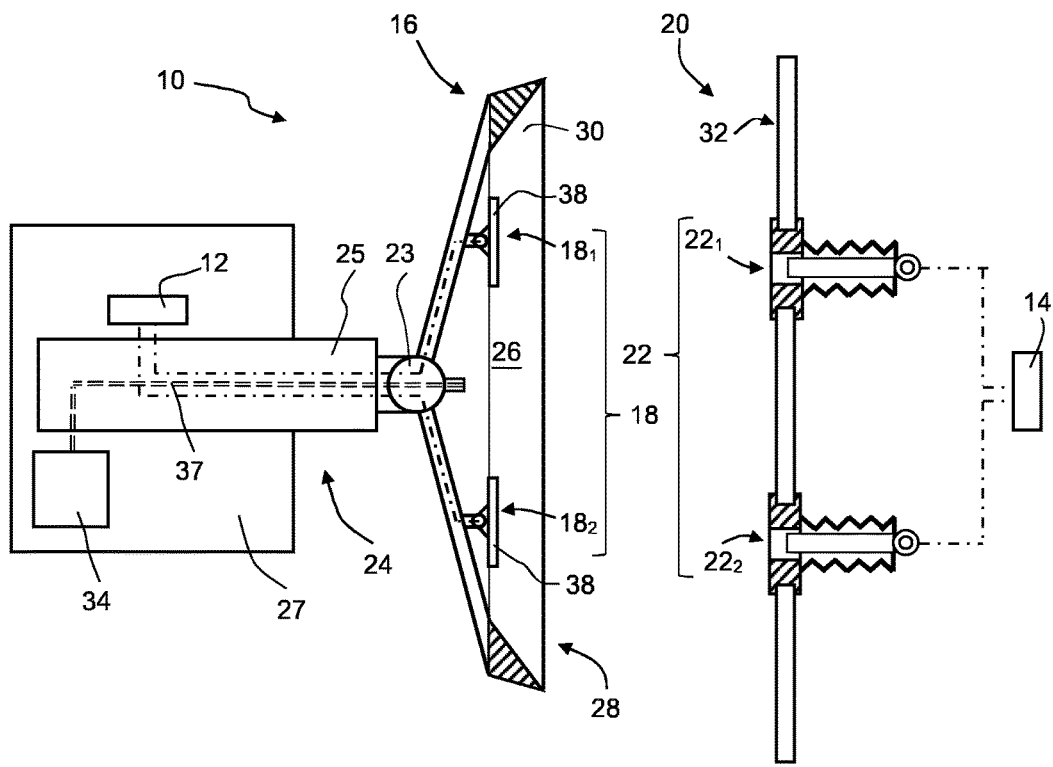
FIG. 1A: is a schematic view, partially drawn as a sectional view, of a first embodiment of the proposed system for automatically establishing a temporary electrical power connection, wherein the system is shown before the electrical power connection is established.
Figure 1B:
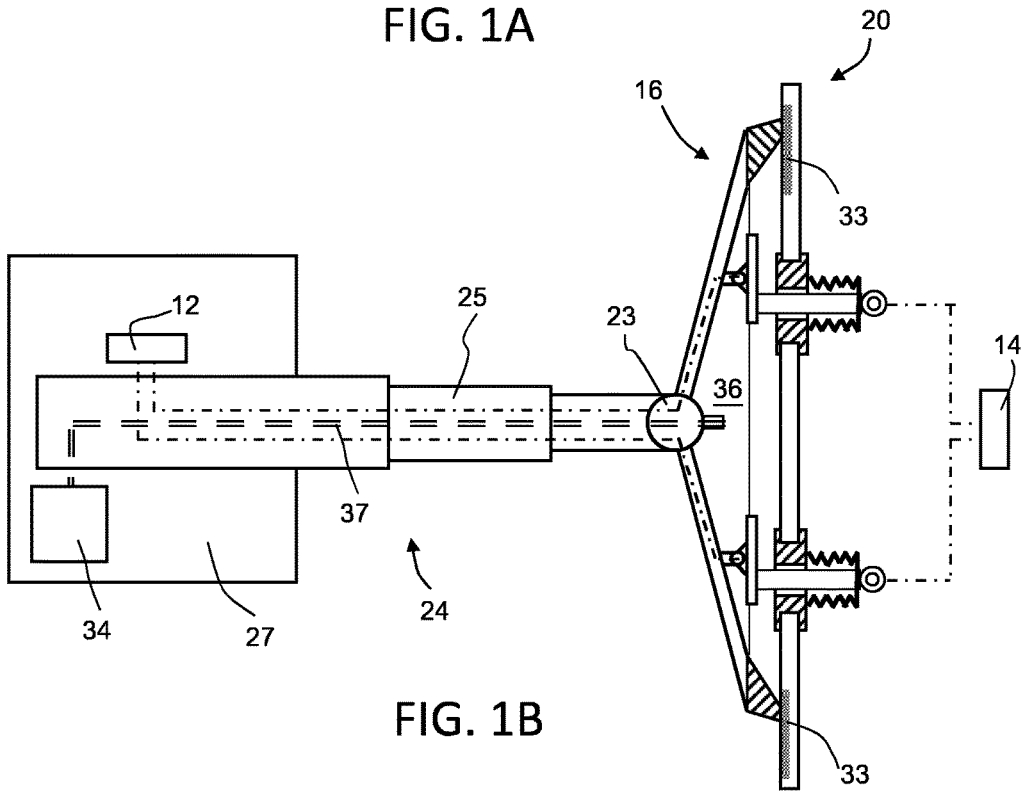
FIG. 1B: is a schematic view as in FIG. 1, wherein the system is shown after the electrical power connection has been established.
Figure 2A:
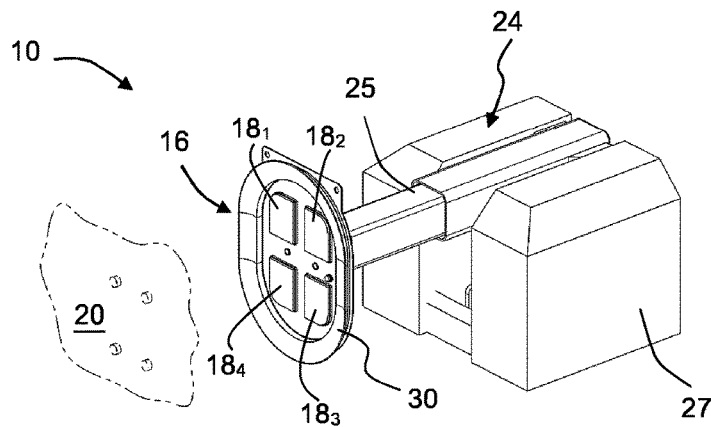
FIG. 2A: is a three-dimensional view of a system as in FIG. 1A.
Figure 2B:
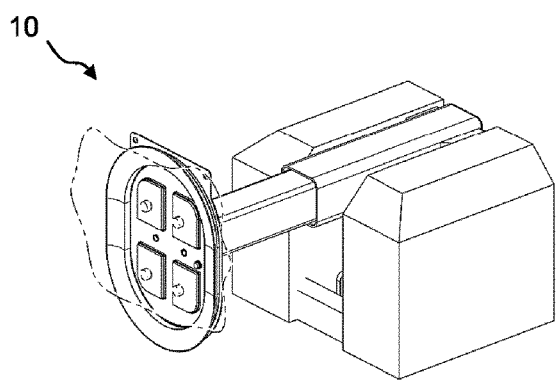
FIG. 2B: is a three-dimensional view of a system as in FIG. 1B.

FIG. 1A and FIG. 1B schematically show a system 10 for automatically establishing a temporary electrical power connection between a first electrical power distribution (schematically represented by rectangle 12) and a second electrical power distribution (schematically represented by rectangle 14). For example, reference 12 may be an electrical power supply panel and reference 14 may be an electrical power distribution terminal on a vehicle, ship or aircraft, which has to be temporarily connected to the electrical power supply 12, e.g. for recharging its batteries and/or for supplying electrical systems of the vehicle, ship or aircraft with electricity, when on-board power generation is shut down. (It is however not excluded that reference 14 is an electrical power supply panel and reference 12 is an electrical power distribution panel). FIG. 2A and FIG. 2B show a similar system as in FIG. 1A and FIG. 1B in a three-dimensional view. It will be noted that the electrical power distribution system in which the electrical power connection is to be established is normally an alternating current (AC) system, under the form of either a single phase system or a three phase system (with or without neutral), but it may also be a direct current (DC) system. The nominal voltage of the distribution system will normally be in the range of 100 V to 3.5 kV, but voltages up to 6.6 kV, and in the range of 12 V to 100 V are also possible.

The proposed system comprises a first coupling member 16 with first electrical coupling means 18, electrically connected to the first electrical power distribution 12, and a separate second coupling member 20 with second electrical coupling means 22 electrically connected to the second electrical power distribution 14. A support mechanism 24 supports the first coupling member 16, preferably via one or more articulation joints having a spring centred position (e.g. a cylindrical joint with a vertical axis, a combination of a cylindrical joint with a vertical axis and a cylindrical joint with a horizontal axis, or a spherical joint), so as to allow the first coupling member 16 to adapt its orientation in space to that of the second coupling member 20, when entering in contact with the latter The support mechanism 24 is configured for bringing the first coupling member 16 from a parking position (shown in FIGS. 1A and 2A) into a coupling position (shown in FIGS. 1B and 2B) and vice-versa. It may be a very simple mechanism with only one translational and/or one rotational degree of freedom, or a more complex mechanism including several translational or rotational degrees of freedom or a combination of translational and rotational degrees of freedom. All these degrees of freedom are preferably motorized and controlled by a controller, so that the first coupling member 16 can be brought automatically (i.e. with no or reduced human intervention) from said parking position (shown in FIGS. 1A and 2A) into said coupling position (shown in FIGS. 1B and 2B) and vice-versa. The support mechanism 24 shown in FIGS. 1A, 1B, and 2A, 2B includes e.g. a telescopic arm 25, for moving the coupling member 16 in a coupling direction, i.e. basically in a direction towards the front surface of the second coupling member 20. This telescopic arm 25 is supported by a support structure 27, preferably so as to be pivotable about a horizontal axis, for adjusting, if necessary, the height of the coupling member 16. Additionally, the telescopic arm 25, or the support structure 27, may also be pivotable about a vertical axis, for adjusting, if necessary, the horizontal position of the coupling member 16 relative to the second coupling member 20. Alternatively, the support structure 27 may also be movable along one or more guide rails (not shown) in a direction perpendicular to the coupling direction, for adjusting, if necessary, the horizontal position of the coupling member 16 relative to the second coupling member 20.

In the coupling position, the first electrical coupling means 18 and the second electrical coupling means 22 are capable of cooperating for transferring electrical energy between the first electrical power distribution 12 and the second electrical power distribution 14. Today, this power transfer between the first and the second electrical coupling means 18, 22 normally still involves a mechanical contact between both electrical coupling means 18 and 22, but in the future this power transfer may also be a contactless power transfer using e.g. electromagnetic fields.

As best seen in FIG. 1A, the first coupling member 16 includes a cavity 26 in which the first electrical coupling means 18 are arranged. This cavity 26 has an open front end 28 surrounded by a protruding sealing ring 30. The latter is preferably made of an elastomeric material (i.e. a material that is able to resume its original shape when a deforming force is removed). Preferably, this elastomeric material also has electrically isolating properties. In FIG. 1A, the undeformed cross-section of this sealing ring 30 is—for the sake of simplicity—schematically shown as a simple triangle. In practice, this sealing ring 30 will generally have a more complex cross-section (showing e.g. one or more sealing lips) optimized for providing, in its deformed state shown in FIG. 1B, an improved hermetic contact with an opposite contact surface for the sealing ring. Also the deformed section shown in FIG. 1B is—for the sake of simplicity— only a very schematic representation, which does not correspond to reality.

The second coupling member 20 includes a sealing ring contact surface 32 for the sealing ring 30. This sealing ring contact surface 32 surrounds the second electrical coupling means 22 and is capable of cooperating with the sealing ring 30, so that the second coupling member 20 hermetically closes the open front end 28 of the cavity 26, when both coupling members 16, 20 are in their coupling position, and the sealing ring 30 is pressed against the sealing ring contact surface 32, as shown e.g. in FIG. 1B. In FIGS. 2A and 2B, a front view of the first coupling member 16 is seen, whereas the second coupling member 18 is only schematically represented with a dotted line. It will be noted that there is not only one position in which the sealing ring 30 may be pressed against the sealing ring contact surface 32. There is a whole ring zone around the second electrical coupling means 22 wherein such a contact is possible (see doted surface 33 in FIG. 1B).

In FIGS. 1A and 1B, reference number 34 points to a vacuum generating device (as e.g. a vacuum pump), which is connected to the cavity 26 by means of a vacuum piping 37. When the open front end 28 of the cavity 26 is hermetically closed by the second coupling member 20, a vacuum chamber 36 is formed between the first and second coupling member 16, 20 (see FIG. 1B). The vacuum generating device 34 is dimensioned for creating within this vacuum chamber 36 a vacuum that is sufficient to warrant that the first coupling member 16 and the second coupling member 20 are held firmly together in their coupling position by the air pressure of the surrounding atmosphere. In the embodiment of FIGS. 1A and 1B, the vacuum generating device 34 is associated with the first coupling member 16, i.e. the vacuum piping 37 is connected to the cavity 26 in the first coupling member 16. It will however be understood that the vacuum generating device 34 may also be associated with the second coupling member 20, i.e. the vacuum piping 37 may be connected to the second coupling member 20, e.g. form an opening in the central zone of the latter, i.e. the zone surrounded by the ring zone 33.

FIGS. 1A and 1B show two surface electrodes $18_1$, $18_2$, which are part of the first electrical coupling means 18 in the first coupling member 16, and two contact electrodes assemblies $22_1$, $22_2$, which are part of the second electrical coupling means 22 in the second coupling member 20. Each of the surface electrodes $18_1$, $18_2$ includes an electrical contact plate 38, whose front surface consists of an electrically conductive material that is relatively corrosion resistant.

Figure 6A:
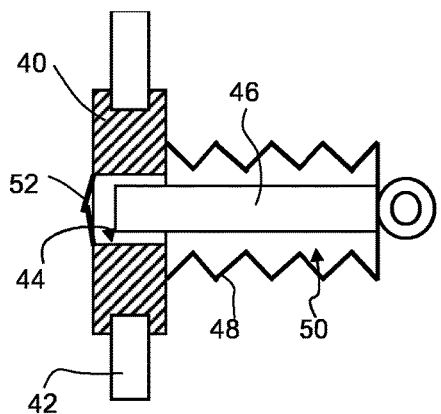
FIG. 6A: is a sectional view of a first embodiment of a bellows-operated rod-shaped contact electrode, wherein the latter is shown in a retracted parking position.
Figure 6B:
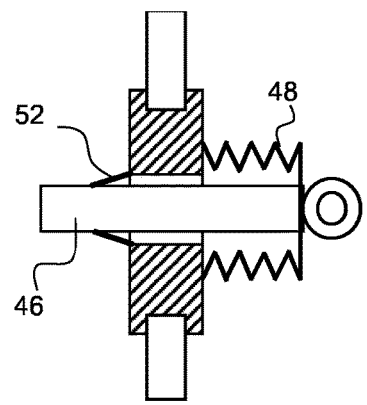
FIG. 6B: is a sectional view of the bellows-operated rod-shaped contact electrode of FIG. 6A, wherein the latter is shown in an extracted operational position.

The contact electrodes assemblies $22_1$, $22_2$ shown in FIGS. 1A and 1B are described with reference to FIGS. 6A and 6B, which are enlarged representations thereof. Each of these contact electrodes assemblies $22_i$ includes a mounting block 40 mounted in a hole of a support structure 42, which forms the sealing ring contact surface 32 for the sealing ring 30 around the contact electrodes assemblies $22_i$. The mounting block 40, which is preferably made of an electrically isolating material, includes an opening 44 for a contact electrode 46. This contact electrode 46 is usually a cylindrical contact made of an electrically conductive material with a good corrosion resistance. Alternatively, only the front end of the contact electrode 46 is made of such an electrically conductive material and connected to an electrical conductor passing axially through a shaft of the contact electrode (which may than be made of an electrically isolating material) (see also FIGS. 7A and 7B, in which such an alternative contact electrode 46' is schematically illustrated). In this case the electrically conductive front end of the contact electrode 46' is advantageously replaceable wearing part. The front end of the contact electrode 46 is axially arranged in the opening 44 of the mounting block 40. Its rear end is connected to a closed rear end of an axially compressible resilient rubber bellows 48. The opposite front end of this rubber bellows 48 is open and connected in a sealed manner to the mounting block 40, so as to surround the opening 44. It follows that the contact electrode 46 is axially movable in the opening 44 of the mounting block 40, and the axially compressible resilient rubber bellows 48 delimits around the contact electrode 46 a bellows chamber 50 in communication with the vacuum chamber 36. When a vacuum is established in the vacuum chamber 36, this vacuum also establishes in the bellows chamber 50. The atmospheric pressure around the rubber bellows 48 axially compresses the latter, whereby it pushes the contact electrode 46 from a parking position, in which its front end is retracted in the opening 44 (see FIG. 6A), axially into an operational position, i.e. an electrical coupling position, in which its front end protrudes out of the opening 44 (see FIG. 6B).

In the retracted parking position of the contact electrode 46, the entrance of the opening 44 is advantageously closed by overlapping flexible flaps 52. These flexible flaps 52 are pushed open by the front end of the contact electrode 46 as soon as the latter is pushed by the compressed rubber bellows 48 out of the opening 44. Alternatively, the opening 44 could also be closed by rigid flaps opened by a smaller vacuum cylinder, arranged perpendicular to the contact electrode 46 movement and operating at a higher vacuum pressure (0.8 bar) than the actual bellow 48 (acting at 0.6 bar). In the final operational position of the contact electrode 46, these flexible flaps 52 rest against the perimeter surface of the contact electrode 46 (see FIG. 6B), thus protecting the annular gap between the contact electrode 46 and the wall of the opening 44 against penetration of water, dirt and other foreign matter. If the vacuum in the vacuum chamber 36 is broken, the resilient rubber bellows 48 resumes its original form (shown in FIG. 6A), i.e. the front end of the contact electrode 46 is withdrawn into the opening 44 and the flexible flaps 52 close again the entrance of the opening 44 by mutually overlapping.

Figure 7A:
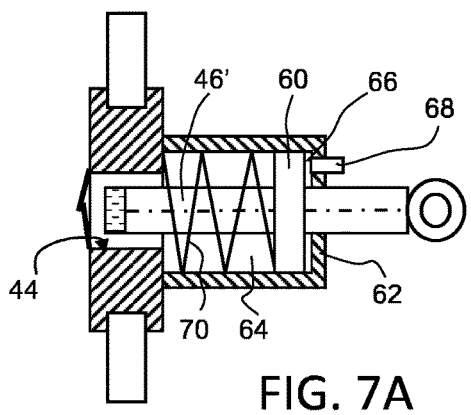
FIG. 7A: is a sectional view of a second embodiment of a piston-operated contact electrode, wherein the latter is shown in a retracted parking position.
Figure 7B:
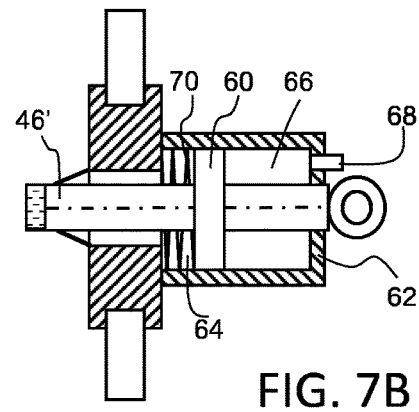
FIG. 7B: is a sectional view of the piston-operated contact electrode of FIG. 7A, wherein the latter is shown in an extracted operational position.

FIGS. 7A and 7B show an alternative embodiment of a contact electrode assembly. In this embodiment the axially compressible rubber bellows 48 is replaced by a vacuum operated piston assembly. The contact electrode 46' comprises a piston 60. The latter is axially movable in a piston housing 62, so as to seal therein a vacuum piston chamber 64, which is through the opening 44 in communication with the vacuum chamber 36, from a vented piston chamber 66, which is through a vent opening 68 in communication with the atmosphere. A piston retracting spring 70 urges the piston 60 to the rear end of the piston housing 62 into a position in which the volume of the vacuum piston chamber 64 is maximum and the volume of the vented piston chamber 66 is minimum. The flaps 52 could also be opened by a smaller vacuum cylinder, perpendicular to the contact electrode 46 movement, operating at a higher vacuum pressure (acting for example at 0.8 bar) than the actual bellow 48 (acting for example at 0.6 bar). In FIGS. 7A and 7B, the piston retracting spring 70 is arranged in the vacuum piston chamber 64, but it may also be arranged outside of piston housing 62 (instead of being a compression spring it may also be an extension spring). When—in the coupling position—a vacuum is established in the vacuum chamber 36, the vacuum piston chamber 64 is put under vacuum too. The atmospheric pressure in the vented piston chamber 66 now urges the piston 60 to the front end of the piston housing 62, whereby the piston retracting spring 70 is compressed, and the front end of the contact electrode 46' is axially pushed from a parking position, in which it is retracted in the opening 44 (see FIG. 7A), into an operational position, in which it protrudes out of the opening 44 (see FIG. 7B). Instead of simply venting the piston chamber 66, the latter may also be connected to a pressure source (at a pressure much higher than atmospheric pressure) when the vacuum is created in the vacuum chamber 36. Thereby the contact pressure between the contact electrode 46' and the surface electrode $18_i$ can be substantially increased. The valve supplying the pressure fluid into the piston chamber 66 and venting the latter may then be advantageously triggered by the vacuum establishing in the vacuum chamber 36.

Figure 4:
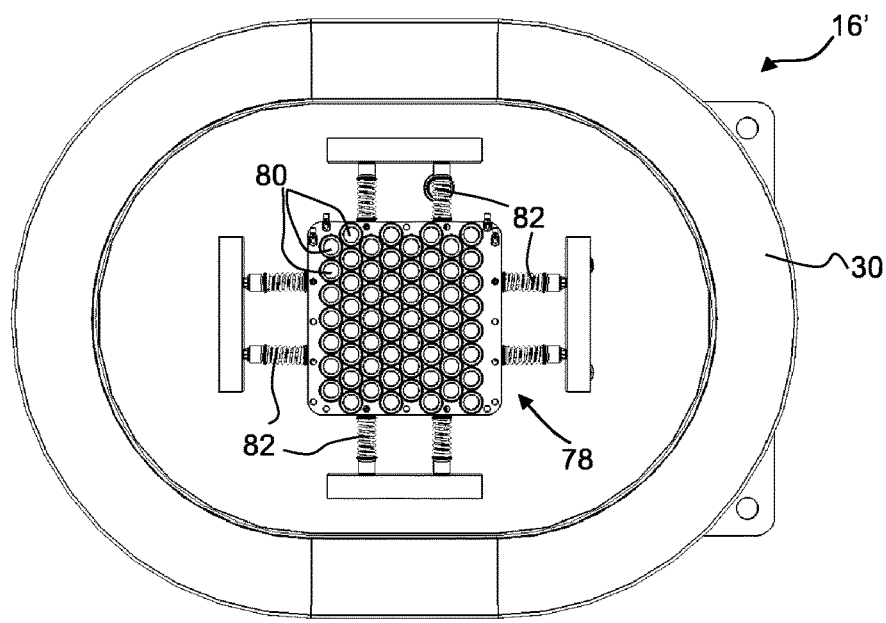
FIG. 4: is a front view of an embodiment of a first coupling member with just one surface electrode, this surface electrode including a two-dimensional array of sockets.

FIG. 4 shows a front view of an embodiment 16' of the first coupling member including a particular embodiment of a surface electrode 78 to be advantageously used in combination with a contact electrode assembly $22_i$. This surface electrode 78 includes a two-dimensional array of closely packed identical sockets 80. All these sockets 80 of the surface electrode 78 are electrically interconnected, i.e. they are all connected, in case of a DC system, to the same electrical conductor, or in case of an AC system, to the same electrical phase or to the neutral. In FIG. 4 there are e.g. n columns of sockets 80, wherein each column includes alternately n or n+1 sockets 80, and the sockets 80 of two neighbouring columns are staggered so as to minimize and equalize the distances between the sockets 80. Each of these sockets 80 is configured for receiving a rod-shaped contact electrode and establishing an electrical contact thereto. In other words, any one of these sockets 80 forms for the rod-shaped contact electrode 46 a possible electrical coupling position. The electrical contact surface of the socket is hereby formed by the inner surface central channel of socket 80 in which the electrode 46 has to axially penetrate. Alternatively, the socket 80 may include as a contact surface a lateral resilient blade contact (not shown), which protrudes into the central channel in which the rod-shaped contact electrode 46 has to axially penetrate. With this kind of surface electrode 78, the perimeter surface of the rod-shaped electrode 46 is used as electrical contact surface. Alternatively or additionally, a lateral resilient blade contact (not shown) may be arranged on the periphery of the rod-shaped electrode 46 so as to contact a contact surface formed in the central channel of the socket 80. In any of these cases, when the rod-shaped electrode 46 axially penetrates into the central channel of the socket 80, the electrical contact surfaces on the rod-shaped electrode 46 and the socket rub against one another, which cleans these contact surfaces from dirt and corrosion products, thereby improving the electrical contact.

To allow a reliably penetration of the contact electrode 64 into one of the sockets 80, the surface electrode 78 is advantageously centred by centring springs 82, so as to have, in a plane that is substantially perpendicular to the penetration direction of the contact electrode into the sockets 80, two resiliently centred degrees of freedom. Each of these degrees of freedom has an amplitude of at least +/−D/2, wherein D is the biggest distance between the central axes of two adjacent sockets 80. The entrance section of any one of the sockets 80 is funnel shaped, and the openings of these funnel shaped sections are aligned as close as possible to one another in a common plane (preferably they are tangent to one another in this plane). The front end of the contact electrode 46 is conically shaped, so that due to the aforementioned two resiliently centred degrees of freedom of the surface electrode 78 and the funnel shaped inlet sections of the sockets 80, one of the sockets 80 centres itself on the contact electrode 46, when the latter is axially pushed towards the surface electrode 78 (or the surface electrode 78 is pushed towards the contact electrode 46). Alternatively or additionally, the contact electrode 46 may be mounted so as to have, in a plane that is substantially perpendicular to the penetration direction of said contact electrode into said sockets, two resiliently centred degrees of freedom for centering itself in one of the socket 80. It will further be appreciated that in the embodiment of the contact assembly 18 shown in FIG. 6A, the resilient rubber bellows 48 allows a slightly inclined position of the contact electrode 46 during the initial penetration of the contact electrode 46 into the socket 80, which further simplifies this penetration.

Figure 5:
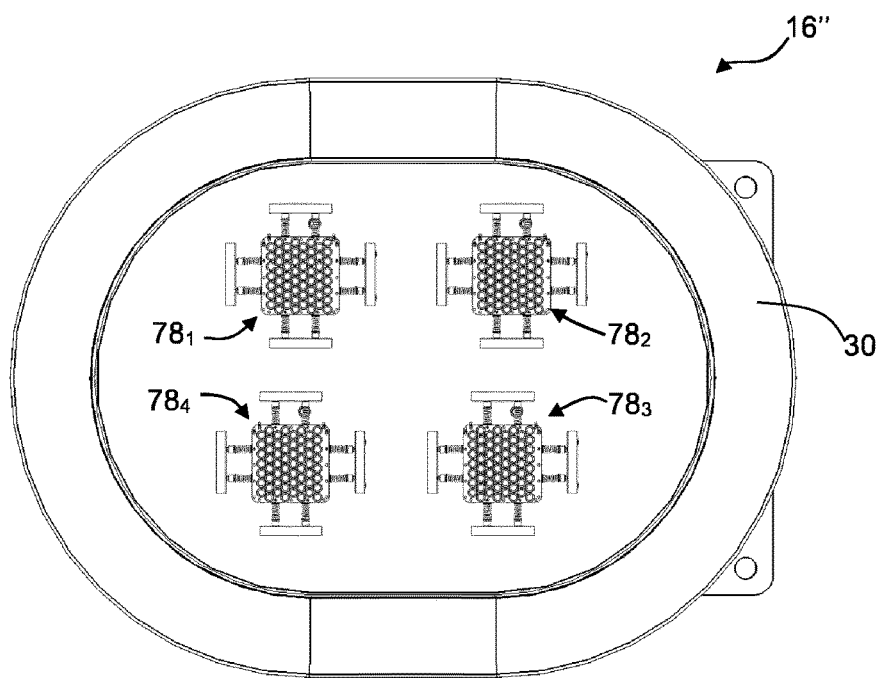
FIG. 5: is a front view of a further embodiment of the first coupling member with four surface electrodes as in FIG. 4.

FIG. 5 shows a front view of an embodiment 16″ of the first coupling member including four separate surface electrodes $78_1$, $78_2$, $78_3$, $78_4$ as described above, i.e. in case of a three phase alternative current, one surface electrode for each phase and one surface electrode for the neutral (if required). The corresponding second coupling member (not shown) will then include four corresponding contact electrode assemblies. In case of a direct current, the first coupling member will include two separate surface electrodes $78_1$, $78_2$, i.e. one surface electrode connected to the positive conductor and one surface electrode connected to the negative conductor.

Figure 3:
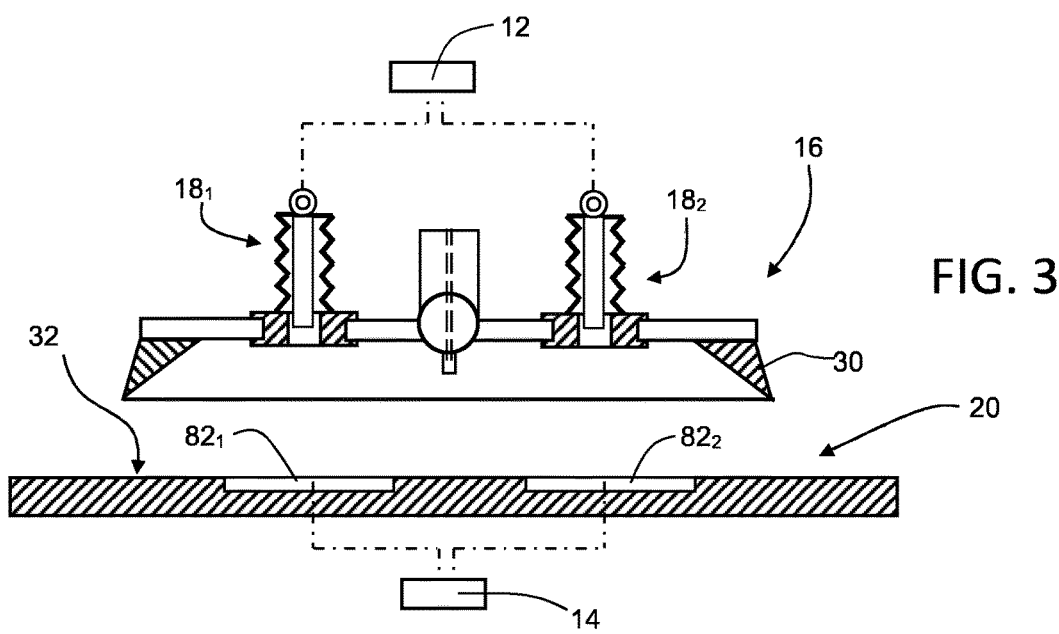
FIG. 3: is a schematic sectional view of a further embodiment of the proposed system for automatically establishing a temporary electrical power connection, wherein the system is shown before the electrical power connection is established.

FIG. 3 illustrates an alternative embodiment of the proposed system, which distinguishes over the embodiments of FIGS. 1A, 1A, 2A, 2B, 4 and 5, mainly in that: (1) the first electrical coupling means 18 (i.e. those included in the first coupling member 16 and surrounded thereon by the sealing ring 30) are formed by contact electrode assemblies $18_1$, $18_2$, which are e.g. designed as shown in FIG. 6A or 7A; and (2) the second electrical coupling means 22 (i.e. those included in the second coupling member 20 and surrounded therein by the sealing ring contact surface 32 for the sealing ring 30) are formed by surface electrodes, here more particularly conductive plates $82_1$, $82_2$ (which may of course be replaced by surface electrodes 78 including a two-dimensional array of sockets 80 as described hereinbefore).

To enhance the contact between the contact electrode 46 and the surface electrode $18_i$, the contact electrode 46 is advantageously mounted so as to be capable of revolving or oscillating about its central axis when it is in contact with the surface electrode $18_i$. The object of this rotary or oscillating motion is to clean the electrical contact surfaces from dirt and/or oxides, thereby significantly improving the electrical contact. To achieve this object the contact electrode 46 can be connected to a rotary drive (not shown) capable of revolving the contact electrode 46 completely about its central axis, or a linear drive (not shown) capable of revolving the contact electrode 46 about its central axis under the form of a to-and-fro movement with an angular amplitude of less than 360°. Such a rotary or linear drive has to be supplied with electricity or with a pneumatic or hydraulic fluid. In an alternative embodiment, which does not require external energy, the electrode revolving drive comprises a spring (e.g. a compression or a torsional spring), wherein this spring stores energy when the contact electrode 46 is pushed into its operational position and releases the stored energy by revolving the contact electrode 46 about its central axis as soon as the contact electrode 46 enters into contact with the surface electrode $18_i$. In a further embodiment, the electrode revolving drive comprises a bimetal, which is connected to the contact electrode 46 to revolve the latter by a small angle about its central axis, when it heats up due to the current flowing between the surface electrode $18_i$ and the contact electrode 46. In still another embodiment, the electrode revolving drive just transforms a small axial oscillation of the contact electrode 46 in a small angular oscillation of the contact electrode 46 about its central axis. To generate the axial oscillation of the contact electrode 46, the vacuum generating device comprise e.g. a control system capable of modulating (i.e. alternately increasing and decreasing) the vacuum in the vacuum chamber 36 relative to a reference value $P_0$, whereby the axial spacing of the two first and second coupling member 16, 20 is (due to the flexibility of the sealing ring 30) also modulated, and the contact electrode 46 is subjected to an axial oscillation and, by means of the electrode revolving drive, to an angular oscillation about its central axis. Even if this angular oscillation of the contact electrode 46 about its central axis has only a very small amplitude (e.g. an amplitude of only some degrees), this oscillatory movement will normally result in a significant improvement of the electrical contact (i.e. in a significant reduction of contact resistance due e.g. to oxidation).

Figure 8A:
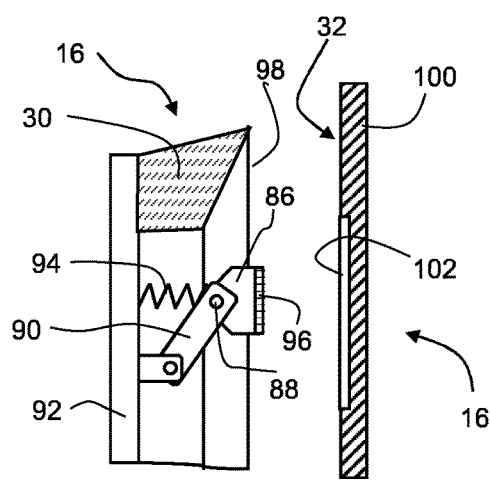
FIG. 8A: is a sectional detail view of a further embodiment of the proposed system for automatically establishing a temporary electrical power connection, wherein the system is shown before the electrical power connection is established.
Figure 8B:
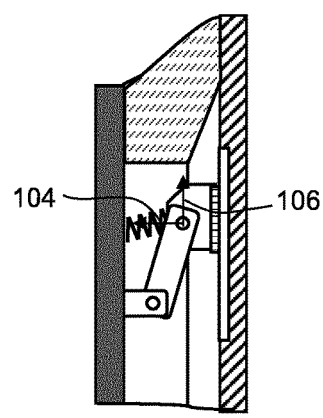
FIG. 8B: is a sectional view as in FIG. 8A, wherein the system is shown after the connection has been established.

FIGS. 8A and 8B illustrate an alternative embodiment in which the first electrical coupling means 18 comprise an electrical contact shoe 86. The latter is mechanically connected via an articulation 88, which advantageously provides two rotational degrees of freedom (e.g. includes two orthogonal cylindrical articulations or a spherical articulation) to a free end of lever arm 90. The latter is pivotably connected to a structure 92 of the first coupling member 16. A spring 94 urges the contact shoe 86 in a position in which an electrical contact element 96, which forms the front surface of the contact shoe 86, protrudes over a plane containing the rim 98 of the sealing ring 30 of the first coupling member 16, or is at least located closely behind of this plane (see FIG. 8A). The spring 94 may act on the contact shoe 86 (as shown in FIGS. 8A and 8B) or onto the lever arm 90. It may e.g. be a compression spring as shown or a torsional spring associated with the pivotable connection of the lever arm 90 to the structure 92. Further springs or other resilient elements (not shown) are preferably associated with the articulation 88 (and/or the contact shoe 86) to warrant a resilient rest position of the latter in which its front surface is substantially parallel to plane containing the rim 98 of the sealing ring 30.

In the embodiment of FIGS. 8A and 8B, the second coupling member 20 comprises a support plate 100, which forms the sealing ring contact surface 32, and which supports a surface electrode 102, which is electrically isolated from the support plate 100 (if the latter consists of an electrically conductive material). FIG. 8B shows the first and second coupling member 16, 20 in the coupling position after a vacuum $P_0$ has been established in the vacuum chamber 36. To achieve the coupling position of FIG. 8B, the contact shoe 86 has been pushed in the direction of arrow 104, i.e. into the cavity 26 of the first coupling member 16, but also in the direction of arrow 106, i.e. parallel to the surface electrode 102 of the second coupling member 20. Due to the induced movement of the contact shoe 86 in the direction of arrow 106, and the spring force of spring 94, the electrical contact element 96 rubs—during the coupling operation—over the contact surface of the surface electrode 102, which cleans both electrical contact surfaces from dirt and/or oxides. To further improve this cleaning effect, the vacuum generating device is advantageously controlled to modulate (i.e. alternately increase and decrease) the vacuum in the vacuum chamber 36 relative to a reference value $P_0$, whereby the axial spacing of the two first and second coupling member 16, 20 is (due to the flexibility of the sealing ring 30) similarly modulated, and the contact shoe 86 is subjected, by means of the lever arm 90, to a translational oscillation movement over the surface electrode 102.

Even if this translational oscillation movement has only a very small amplitude (e.g. an amplitude of only some millimeters), it will normally result in a significant improvement of the electrical contact (i.e. in a significant reduction of contact resistance due e.g. to oxidation).

The axial alignment tolerance of the first and second electrical coupling means 18, 22 corresponds to the maximum distance that may be tolerated between the central axis of the first electrical coupling means 18 and the central axis of the second electrical coupling means 22 to still warrant a reliable transfer of electrical energy in the so-called coupling position of the first coupling member 16 and the second coupling member 20. Generally, the aforementioned axial alignment tolerance is decomposed in a horizontal and vertical component. It will be appreciated that in the afore-described embodiments, the axial alignment tolerance is mainly determined by the dimensions of the surface electrode 38, 78, 102. The proposed system can therefore be easily designed so that the axial alignment tolerance has a very generous magnitude (e.g. a magnitude in the range of several centimeters or even several decimeters), which greatly facilitates an automatic coupling and makes the design of the support mechanism 24 less complicated and expensive. It is to be particularly appreciated that the mechanical coupling of the first coupling member 16 and the second coupling member 20 may take place in any position in which the sealing ring 30 and the sealing ring contact surface 32 can be hermetically pressed together. In other words, the mechanical coupling of the two coupling members 16, 20 does not require a precise alignment of complementary mechanical parts, so that the aforementioned axial alignment tolerance is solely determined by the dimensions of the surface electrodes 38, 78, 102. No blocking can occur during the mechanical coupling or decoupling operation. Last but not least, during electrical power transfer the contacts are efficiently protected in the vacuum chamber 36 against any contact with body parts, foreign objects and fluids. Safety is even further improved, if the system comprises a control system that automatically interrupts electricity supply if the vacuum in the vacuum chamber 36 drops beyond a certain limit or if the flow rate of the vacuum generating device strongly increases (i.e. if one has to assume that the vacuum chamber 36 is no longer as hermetically closed as it should be).

Figure 9A:
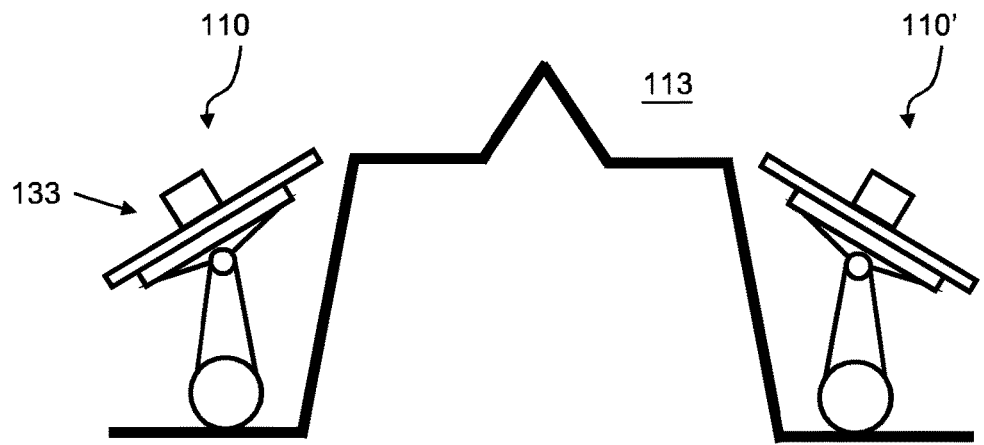
FIG. 9A: is a top view of the mooring system of FIG. 9B, wherein the mooring system occupies a parking position in absence of a ship.
Figure 9B:
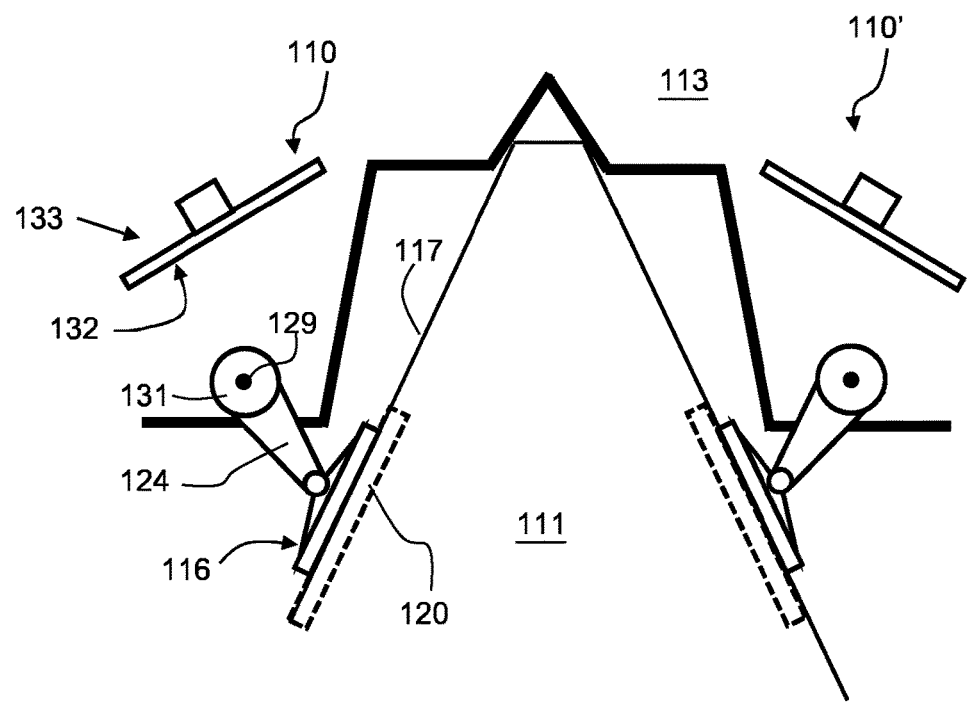
FIG. 9B: is a top view of a mooring system for a ship incorporating a proposed system for automatically establishing a temporary electrical power connection to the ship, wherein the system is shown after this connection has been established.

FIGS. 9A and 9B show two systems 110, 110' as disclosed hereinbefore specifically configured and used for automatically establishing a temporary electrical power connection to a ship 111 (here e.g. a small electrically powered ferry boat) and, simultaneously, for mooring this ship 111 to the quayside, to a pontoon or to another fixed or floatable structure. In FIGS. 9A and 9B reference 113 identifies a dedicated pontoon to which the ship 111 is moored. Both mooring systems 110, 110' are basically identical, so that only the system 110 will now be described in greater detail.

The first coupling member 16 is more particularly configured as a mooring suction pad 116 capable of hermetically engaging a ship hull 117 for applying mooring forces directly to this ship hull 117. The second coupling member 12 is here integrated into the ship hull 117 (and very schematically represented by dashed line). The support mechanism 24 is configured as a mooring mechanism 124, which is supported on the pontoon 113, and configured for bringing the mooring suction pad 116 from a parking position (shown in FIG. 9A) into the coupling position (shown in FIG. 9B) and vice-versa, but also for mechanically transferring important mooring forces to the mooring suction pad 116, when the latter is firmly attached to the ship hull 117 by vacuum creation. In the embodiment of FIGS. 9A and 9B, the support mechanism 124 comprises, for example, a mechanical arm 127 that is pivotable about a vertical axis 129 and preferably mounted on a height adjustable support 131. Many alternative mechanical configurations of the support mechanism 124 are however possible.

In FIG. 9A, the ship 111 has left its docking site and the support mechanism 124 has brought the first coupling member (i.e. the mooring suction pad 116), by a pivoting movement about the vertical axis 129, into its parking position. A dummy coupling member 133 is arranged in this parking position. This dummy coupling member includes an auxiliary sealing ring contact surface 132, wherein the sealing ring 30 of the first coupling member 116 and the auxiliary sealing ring contact surface 132 are configured for being pressed together in the parking position, so as to form a vacuum chamber between the first coupling member 116 and the dummy coupling member 133. In this parking position, the electrical coupling means are consequently very well protected in the vacuum chamber against environmental impacts. If low temperatures are to be expected, the dummy coupling member 133 and/or the auxiliary sealing ring contact surface 132 may equipped with a heating. The dummy coupling member 133 may further be equipped with an automatic cleaning system for the first electrical coupling means. This cleaning system may e.g. be a spray system, capable of spraying a cleaning liquid and/or an electrical contact enhancing liquid onto the first electrical coupling means, or a mechanical cleaning system, e.g. capable of mechanically brushing the contact surfaces of the first electrical coupling means. The dummy coupling member 133 may also be equipped with a device for automatically applying a conductive paste onto the contact surfaces of the electrodes of the first coupling member 16.

Figure 10:
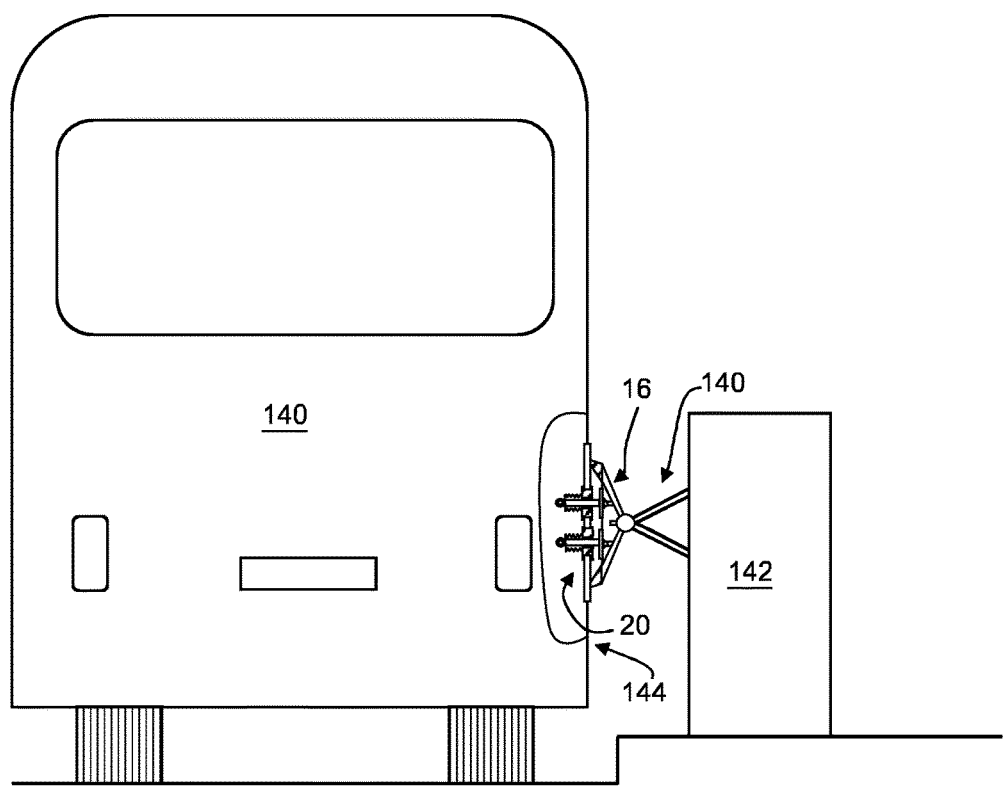
FIG. 10: is an elevation view showing a proposed system in use for establishing a temporary electrical power connection to a vehicle, more particularly a bus.

FIG. 10 shows an electrically powered vehicle, here a bus 140, in a docking station 142. A system as disclosed hereinbefore is used for automatically establishing a temporary electrical power connection to the bus 140 for charging its batteries. The first coupling member 16 is supported by a support mechanism 144 mounted in the docking station 142. In the embodiment of FIG. 10, this support mechanism 144 is configured as an extendable arm, in particular a pantograph type arm. The second coupling member 20 is integrated into a sidewall 146 of the chassis of the bus 121.

Figure 11:
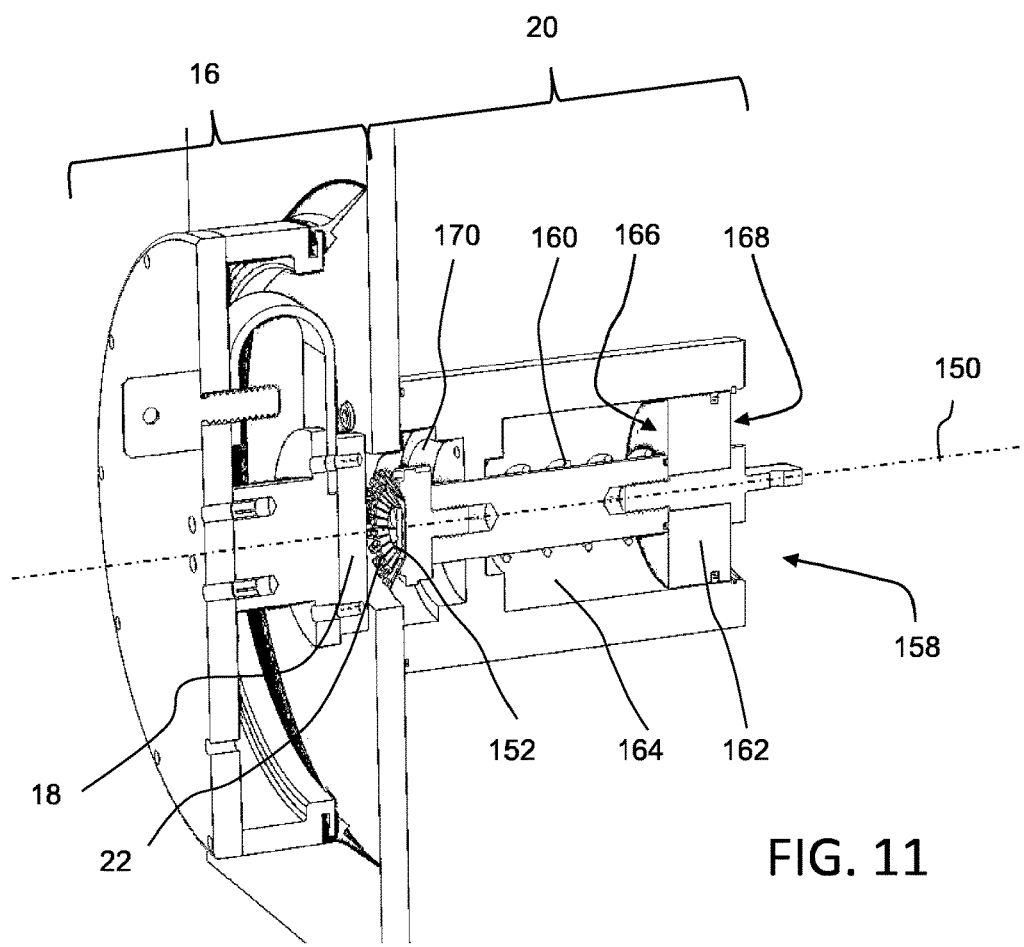
FIG. 11: is a three-dimensional sectional view showing a further embodiment of the first or second electrical coupling means.
Figure 12:
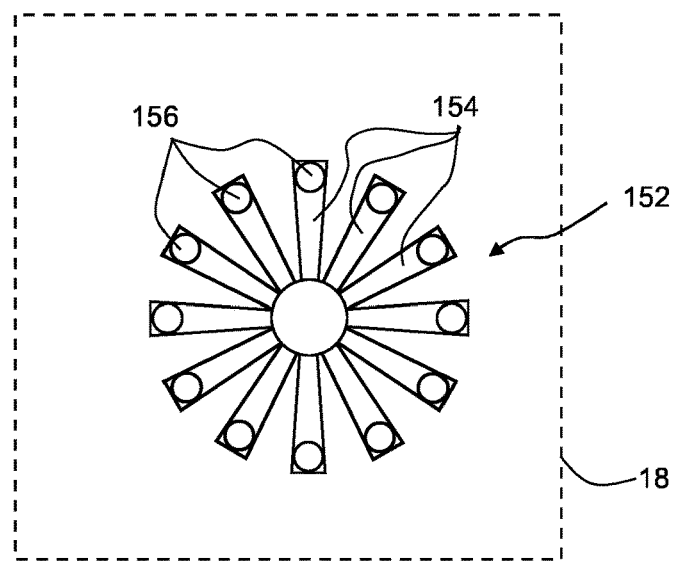
FIG. 12: is a schematic plan view of a preferred frontal contact device in an electrical coupling means as shown in FIG. 11.

FIG. 11 and FIG. 12 illustrate a further embodiment of the electrical coupling means 18, 22. The first electrical coupling means 18 is a surface electrode comprising a frontal contact surface providing the plurality of possible electrical coupling positions. In FIG. 11 the frontal contact surface of the surface electrode is not seen, but in FIG. 12 its boundary is represented by a dash-dot square identified with reference number 18.

In FIG. 11, reference 150 identifies a central coupling axis of the contact electrode 22 cooperating with the surface electrode 18. This contact electrode 22 has a frontal contact device 152. As best seen in FIG. 12, the frontal contact device 152 includes a plurality of resilient fingers 154 extending radially away from the central coupling axis 150. Each of these resilient fingers 154 has a free end with an electrical contact element 156 thereon.

In FIG. 11 and FIG. 12, the frontal contact device 152 is shown in front of the surface electrode 18, just before contacting its frontal contact surface. During the electrical coupling operation, the central coupling axis 150 is substantially perpendicular to the frontal contact surface of the surface electrode 18. To establish electrical contact, the frontal contact device 152 is pressed along the central coupling axis 150 onto the frontal contact surface, wherein its resilient fingers 154 are pressed with their electrical contacts elements 156 against the frontal contact surface of the surface electrode 18 and are hereby resiliently deformed. It will be appreciated that, due to the plurality of resilient fingers 154, this embodiment warrants a very reliable electrical contact.

The contact electrode 22 with its contact device 152 is advantageously supported by a linear actuator 158 arranged for axially displacing the contact device 152 along the central coupling axis 150. This linear actuator 158 may be an electrical, hydraulic or pneumatic linear actor. In a preferred embodiment, which requires no external energy, the linear actuator 158 includes a spring 160, which is arranged so as to urge the contact device 152 in a retracted parking position, and a piston 162, which is arranged in a piston chamber 164 so as to urge the contact device 152 from the retracted parking position into a protruding electrical coupling position. The piston chamber 164 is advantageously in communication with the vacuum chamber 36, so that establishing the vacuum in the vacuum chamber 36 establishes a vacuum in the piston chamber 164 too. The piston chamber 164 is closed in a sealed manner by the piston 162, wherein a first section 166 of the piston 162 is exposed to the vacuum in the piston chamber 164, and an opposite second section 168 of the piston 162 is exposed to atmospheric pressure, so that atmospheric pressure acting on the second section 168 pushes the piston 162 into the piston chamber 164, wherein it compresses the spring 160. It will be appreciated that this embodiment allows to provide a protected parking position for the contact device 152 (in which it is e.g. retracted in a cavity 170) and to bring it into an operational position (in which it protrudes out of the cavity 170), without necessitating auxiliary energy.

To even further improve contact with the aforementioned resilient fingers 154 (or other contact devices capable of resiliently deforming under a contact pressure), the vacuum generating device may comprise a control system capable of modulating or pulsing (i.e. alternately increasing and decreasing) the vacuum in the vacuum chamber 36 relative to a reference value $P_0$, whereby the axial spacing of the two first and second coupling member 16, 20 is (due to the flexibility of the sealing ring 30) also modulated or pulsed. It follows that the resilient fingers 154 are subjected to an oscillating contact pressure, which results in that the electrical contact elements 156 are rubbed over the frontal contact surface, whereby contact resistance due to oxidation or surface contamination is substantially reduced.

While specific embodiments have been described herein, those skilled in the art will appreciate that various alternatives and modifications of these embodiments as well as different combinations of the disclosed features are at least implicitly covered by the present disclosure.

LIST OF REFERENCE SIGNS 10 system for automatically establishing a temporary electrical power connection
12 first electrical power distribution
14 second electrical power distribution
16 first coupling member
18 first electrical coupling means
$18_i$ surface electrode
20 second coupling member
$22_i$ contact electrode assembly
22 second electrical coupling means
24 support mechanism
25 telescopic arm of 24
26 cavity in 16
27 support structure of 24
28 open front end of 26
30 sealing ring
32 a sealing ring contact surface
33 possible contact zone of 30 and 32
34 vacuum generating device
36 vacuum chamber
37 vacuum piping
38 electrical contact plate
40 mounting block
42 support structure
44 opening in 40
46 contact electrode
48 rubber bellows
50 chamber in 48
52 flexible flaps
60 piston on 46'
62 piston housing
64 vacuum piston chamber
66 vented piston chamber
68 vent opening
70 piston retracting spring
78 surface electrode
80 socket in 78
82 centring springs
86 contact shoe
88 articulation
90 lever arm
92 structure of 16
94 spring
96 electrical contact element on 86
98 rim of 30
100 support plate
102 surface electrode
104 arrow (in FIG. 8B)
106 arrow (in FIG. 8B)
110 system configured and used for automatically establishing a temporary electrical power connection to a ship and for mooring the latter
111 ship
113 pontoon
116 mooring suction pad
117 ship hull
124 mooring mechanism
127 mechanical arm
129 vertical axis
131 height adjustable support
132 auxiliary sealing ring contact surface
133 dummy coupling member
140 electrically powered bus
142 docking station
144 support mechanism
146 sidewall of 140
150 central coupling axis
152 frontal contact device
154 resilient finger
156 electrical contact element on 154
158 linear actuator
160 spring
162 piston
164 piston chamber
166 first section of 162
168 second section of 162
170 cavity

The invention claimed is:

1. A system for automatically establishing a temporary electrical power connection between a first and a second electrical power distribution, said system comprising:
a first coupling member with a first electrical coupling means electrically connected to said first electrical power distribution;
a second coupling member with a second electrical coupling means electrically connected to said second electrical power distribution;
wherein said first coupling member includes a sealing ring surrounding said first electrical coupling means;
wherein said second coupling member includes a sealing ring contact surface surrounding said second electrical coupling means;
wherein said sealing ring and said sealing ring contact surface are configured for being pressed together, a vacuum chamber arranged between the first coupling member and the second coupling member thus being hermetically sealed off with regard to the atmosphere;
wherein by generating a vacuum in said vacuum chamber, said first coupling member and said second coupling member are firmly coupled together in a mechanical coupling position in which said first electrical coupling means and said second electrical coupling means achieve an electrical coupling position for transferring electrical energy between said first and said second electrical power distribution;
wherein at least one vacuum conduit is connected to said vacuum chamber for establishing in said vacuum chamber a vacuum capable of firmly holding together said first coupling member and said second coupling member, thereby defining said mechanical coupling position;
wherein said first or second electrical coupling means include a surface electrode dimensioned for achieving a plurality of possible electrical coupling positions in a zone around the centre of the surface electrode; and
wherein said seal ring and seal ring contact surface are configured for achieving a sealed contact and thereby a mechanical coupling position in each of these possible electrical coupling positions.

2. The system as claimed in claim 1, further including a support mechanism supporting said first coupling member or said second coupling member, said support mechanism being configured for bringing the supported coupling member from a parking position into said coupling position and vice-versa.

3. The system as claimed in claim 1, wherein said surface electrode is dimensioned for allowing axial alignment tolerances between said first and said second electrical coupling means in the range of several centimeters or several decimeters.

4. The system as claimed in claim 1, wherein said electrical coupling means cooperating with said surface electrode includes a contact electrode, which is arranged so as to be movable along an central coupling axis, wherein it is resiliently biased into a retracted parking position and sucked from said retracted parking position into a protruding electrical coupling position, when said vacuum chamber is put under vacuum.

5. The system as claimed in claim 1, wherein said first or said second electrical coupling means includes a contact electrode and an electrode revolving device, capable of rotating or oscillating the contact electrode about its central axis, when the contact electrode is in contact with a with contact surface.

6. The system as claimed in claim 1, wherein:
said surface electrode includes a two-dimensional array of sockets;
the electrical coupling means cooperating with said surface electrode is a rod electrode configured for being capable of penetrating into each of said sockets and of establishing electrical coupling positions with said socket;
said sockets of said surface electrode include funnel-shaped inlet sections and/or said rod electrode includes a conically-shape front end; and
said surface electrode and/or said rod electrode are mounted so as to have two resiliently centred degrees of freedom, in a plane that is substantially perpendicular to the penetration direction of said rod electrode into said sockets.

7. The system as claimed in claim 1, wherein:
said surface electrode comprises a frontal contact surface providing said plurality of possible electrical coupling positions;
the electrical coupling means cooperating with said surface electrode comprises a contact electrode;
in each of said plurality of possible electrical coupling positions, said contact electrode can be pressed onto said frontal contact surface for establishing an electrical contact.

8. The system as claimed in claim 7, wherein:
said contact electrode includes a frontal contact device;
said frontal contact device includes a plurality of resilient fingers extending radially away from said contact electrode, each of said resilient fingers having a free end with an electrical contact thereon, wherein said resilient forgers and their electrical contacts are arranged so that, when said frontal contact device is pressed onto said frontal contact surface of said surface electrode, said resilient fingers rest with their electrical contacts on said frontal contact surface and are resiliently deformed.

9. The system as claimed in claim 7, wherein said contact electrode is supported by a linear actuator arranged for axially displacing said contact electrode along a central coupling axis.

10. The system as claimed in claim 8, wherein said linear actuator includes a spring arranged so as to urge said contact device in a retracted parking position and a piston arranged so as to urge said contact device from said retracted parking position into a protruding electrical coupling position.

11. The system as claimed in claim 10, wherein said piston is vacuum operated when said vacuum chamber is put under vacuum.

12. The system as claimed in claim 1, further comprising:
a vacuum generating device including a control system capable of pulsing the vacuum in the vacuum chamber relative to a reference value, whereby the axial spacing of the first and second coupling member is pulsed, and said electrical coupling means are subjected to a pulsed contact pressure.

13. The system as claimed in claim 1, wherein:
said system further comprises a dummy coupling member arranged in a parking position, said dummy coupling member including an auxiliary sealing ring contact surface; and
said sealing ring and said auxiliary sealing ring contact surface are configured for being hermetically pressed together in said parking position.

14. The system as claimed in claim 1, wherein:
said first coupling member includes a cavity with an open end; which is surrounded by said sealing ring; and
said first electrical coupling means include several electrodes that are distributed within said cavity so as to be laterally spaced from one another.

15. The system as claimed in claim 1, wherein said first electrical coupling means and said second electrical coupling means are configured for achieving a contactless power transfer using electromagnetic fields.

16. The system as claimed in claim 1, used for automatically establishing a temporary electrical power connection to a vehicle, a ship or an aircraft.

17. The system as claimed in claim 1, used for automatically establishing a temporary electrical power connection to a ship and additionally mooring the ship.

18. The system as claimed in claim 17, wherein:
said first coupling member is configured as a mooring suction pad capable of hermetically coupling to a ship hull for applying mooring forces directly to said ship hull;
said second coupling member is integrated into said ship hull, in a zone wherein said mooring suction pad is hermetically coupled to said ship hull;
said system further including a support mechanism supporting said first coupling member, said support mechanism being configured for bringing the supported coupling member from a parking position into said coupling position and vice-versa and for mechanically transferring said mooring forces; and
said at least one vacuum conduit is connected to a vacuum generating device that is capable of establishing a vacuum in said vacuum chamber so that said mooring suction pad is capable of applying said mooring forces onto said ship hull.

19. A device for automatically establishing a temporary electrical power connection in a system as claimed in claim 1, wherein said device includes:
said first coupling member with said first electrical coupling means electrically connected to said first electrical power distribution, and with said sealing ring surrounding said first electrical coupling means, wherein said first electrical coupling means includes at least one surface electrode dimensioned for achieving a plurality of possible electrical coupling positions; and
said at least one vacuum conduit connected to said first coupling member to establish, in said coupling position with said second coupling member, a vacuum in said vacuum chamber, which vacuum is capable of firmly holding together said first coupling member and said second coupling member in said coupling position.

20. The device as claimed in claim 19, further including a support mechanism, which supports said first coupling member and is configured for bringing said first coupling member from a parking position into said coupling position and vice-versa.

* * * * *